(12) United States Patent
Suzuki

(10) Patent No.: US 6,873,472 B2
(45) Date of Patent: Mar. 29, 2005

(54) CAM RING, AND A ZOOM LENS BARREL WITH THE CAM RING

(75) Inventor: Hiroaki Suzuki, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/428,756

(22) Filed: May 5, 2003

(65) Prior Publication Data

US 2003/0210478 A1 Nov. 13, 2003

(30) Foreign Application Priority Data

May 7, 2002 (JP) .......................................... 2002-131420

(51) Int. Cl.[7] .............................................. G02B 15/14
(52) U.S. Cl. ...................... 359/699; 359/700; 359/701; 359/704; 359/826; 359/822
(58) Field of Search ................................ 359/699, 700, 359/701, 703, 704, 706, 823, 825, 822, 694, 826; 396/85, 349

(56) References Cited

U.S. PATENT DOCUMENTS

| | | | |
|---|---|---|---|
| 5,978,602 A | * 11/1999 | Toyofuku et al. | ............. 396/62 |
| 6,437,924 B1 | * 8/2002 | Azegami | ..................... 359/694 |
| 6,445,517 B1 | * 9/2002 | Nomura et al. | ............. 359/823 |
| 6,519,096 B2 | 2/2003 | Nomura et al. | ............. 359/700 |
| 6,522,481 B2 | * 2/2003 | Nomura et al. | ............. 359/699 |

* cited by examiner

Primary Examiner—Ricky Mack
Assistant Examiner—Brandi Thomas
(74) Attorney, Agent, or Firm—Greenblum & Bernstein, P.L.C.

(57) ABSTRACT

A zoom lens barrel includes a linear guide ring which is positioned about an optical axis and includes a linear guide slot; a cam ring which is coaxially positioned around the linear guide ring and includes a cam groove; and a movable lens frame which supports a lens group and includes a cam follower which passes through the linear guide slot and engages in the cam groove. The cam ring is provided with a large ring portion, a small ring portion having a smaller diameter than the large ring portion, and a radial flange portion positioned therebetween. The cam groove is formed on both the small ring portion and the radial flange portion so that one end of the cam groove constitutes an open end at the radial flange potion, whereby the cam follower can be inserted into the cam groove through the open end.

13 Claims, 5 Drawing Sheets

CAM RING, AND A ZOOM LENS BARREL WITH THE CAM RING

BACKGROUND OF THE INVENTION

1. Field of the Invention

The present invention relates to a cam ring which can serve as an element of a zoom lens barrel. The present invention also relates to a zoom lens barrel which incorporates such a cam ring.

2. Description of the Related Art

In a typical conventional zoom lens barrel, a plurality of (e.g., two) movable lens groups are moved along an optical axis while changing the space therebetween in a predetermined moving manner to perform a zooming operation by rotation of a cam ring driven to rotate about the optical axis. Specifically, the zoom lens barrel is provided inside the cylindrical cam ring with a cylindrical linear guide ring, and is further provided inside the linear guide ring with lens support frames which hold and support the movable lens groups, respectively. A set of follower pins, or a set of cam followers, which project from each lens support frame, pass through an associated set of linear guide slots formed on the linear guide ring, respectively, to be guided linearly along the optical axis. At the same time, the heads (radially outer ends) of the set of follower pins are engaged in an associated set of cam grooves (bottomed cam grooves or cam through slots) formed on the cam ring, respectively. Due to engagement of the set of follower pins of each lens support frame with both the associated set of linear guide slots and the associated set of cam grooves, a rotation of the cam ring causes the movable lens groups to move along the optical axis while changing the space therebetween in a predetermined moving manner to perform a zooming operation.

In such a conventional zoom lens barrel, if the front and rear ends of each cam groove are respectively not open at the front and rear ends of the cam ring, and if the front and rear ends of each linear guide slot are not open at the front and rear ends of the linear guide ring, respectively, each set of follower pins cannot be respectively inserted into the associated set of cam grooves, with each set of follower pins remaining fixed to the associated lens support frame because the distance between the axial center of the lens support frame and the radially outer end of each follower pin is greater than the inner radius of the cam ring, i.e., the distance between the axial center of the cam ring and the inner peripheral surface of the cam ring. Due to this structure, when the set of follower pins of each lens support frame are respectively inserted into the associated set of cam grooves of the cam ring, firstly, the lens support frame to which the set of follower pins are not yet fixed needs to be inserted into the linear guide ring (which is inserted into the cam ring), and thereafter, the set of follower pins need to be respectively inserted into the associated set of cam grooves and the set of linear guide slots from the outside of the cam ring to be fixed to an outer peripheral surface of the lens support frame by a conventional fixing manner, e.g., by screw engagement: a male screw portion formed at the bottom end of each follower pin is installed in a female screw hole formed on the an outer peripheral surface of the lens support frame.

Such an operation making each set of follower pins engaged in the associated set of cam grooves is troublesome.

Moreover, each follower pin cannot be removed from the associated cam groove in a state where the follower pin remains fixed to lens support frame. In this case, firstly, each follower pin needs to be removed radially outwards from the lens support frame, e.g., each follower pin needs to be screwed off from the associated female screw hole on the lens support frame to be removed radially outwards therefrom. Thereafter, the lens support frame needs to be removed from the cam ring and the linear guide ring. This operation is also very troublesome.

Likewise, each follower pin cannot be inserted into or removed from the associated cam groove if each set of follower pins are formed integral with the associated lens support frame since the distance between the axial center of the lens support frame and the radially outer end of each follower pin is greater than the inner radius of the cam ring as mentioned above.

Furthermore, if a cylindrical member such as a stationary barrel of the zoom lens barrel is positioned around the cam ring, each follower pin cannot be inserted into or removed from the associated cam groove since each follower pin needs to be inserted into or removed from the associated cam groove from the outside of the cam ring to be fixed to an outer peripheral surface of the lens support frame as mentioned above.

On the other hand, in the case where the front and rear ends of each cam groove are respectively open at the front and rear ends of the cam ring while the front and rear ends of each linear guide slot are respectively open at the front and rear ends of the linear guide ring, the can ring cannot have a sufficient strength if each set of cams grooves on the cam ring are formed as a set of cam through slots. If each set of cams grooves formed on the cam ring are formed as a set of bottomed cam grooves, the wall thickness of the cam ring increases, i.e., the diameter of the cam ring increases to thereby increase the diameter of the zoom lens barrel.

SUMMARY OF THE INVENTION

The present invention provides a zoom lens barrel incorporating a cam ring, wherein each follower pin projecting from a lens support frame can be inserted into and removed from an associated cam groove even if the follower pin is formed integral with the lens support frame and even if a cylindrical member such as a stationary barrel of the zoom lens is positioned around the cam ring, wherein the cam ring does not have to be enlarged in diameter, and further wherein a reduction in strength of the cam ring due to the formation of the cam groove on the cam ring can be minimized. The present invention further provides such a cam ring.

According to an aspect of the present invention, a zoom lens barrel is provided, including a linear guide ring which is positioned about an optical axis, the linear guide ring including at least one linear guide slot extending parallel to the optical axis; a cam ring which is coaxially positioned around the linear guide ring, the cam ring including at least one cam groove; and a movable lens frame which supports a lens group and includes at least one cam follower, the cam follower passes through the linear guide slot to be engaged in the cam groove so that a rotation of one of the cam ring and the linear guide ring relative to the other causes the movable lens frame to move along the optical axis via engagement of the cam follower with the linear guide slot and the cam groove. The cam ring is provided with a large ring portion, a small ring portion having a smaller diameter than the large ring portion, and a radial flange portion which is positioned between the large ring portion and the small ring portion to connect the large ring portion with the small ring portion. The cam groove is formed on both the small ring portion and the radial flange portion so that one end of the cam groove constitutes an open end at the radial flange potion, whereby the cam follower can be inserted into the cam groove through the open end.

The zoom lens barrel can have at least two the movable lens frames, each having the cam follower which is engaged with a corresponding the cam groove, the cam ring including coaxial first, second and third ring portions having different diameters decreasing in the optical axis direction of the zoom lens barrel, a first radial flange portion which connects the first ring portion with the second ring portion and a second radial flange portion which connects the second ring portion with the third ring portion. One of the cam grooves is formed on both the second ring portion and the first radial portion, and the other of the cam grooves is formed on both the third ring portion and the second radial portion for inserting and guiding the cam followers provided on each of the two movable lens frames, respectively.

The cam groove can be formed on the cam ring as a through slot radially penetrating through the cam ring.

It is desirable for the diameter of the cam ring to decrease in a rearward direction of the cam ring so that the large ring portion is positioned in front of the small ring portion with the radial flange portion being provided therebetween. A front end of the cam groove can extend to a front surface of the radial flange portion to be formed as an open end on the front surface of the radial flange portion so that the cam follower can be inserted into the cam groove through the open end from the front of the cam ring.

It is desirable for the cam follower to be formed integral with the movable lens frame.

The linear guide ring can be a stationary member.

It is desirable for the zoom lens barrel to include a mount ring formed at a rear end of the zoom lens barrel, the linear guide ring being formed integral with the mount ring.

It is desirable for the zoom lens barrel to include a zoom ring which is coaxially provided around the cam ring, the cam ring being rotated about the optical axis via rotation of the zoom ring.

The zoom lens barrel can include a stationary barrel which is coaxially provided between the cam ring and the zoom ring in the radial direction, the zoom ring being rotatably supported on the stationary barrel.

According to another embodiment, a zoom lens barrel is provided, including a first movable lens frame which supports a first lens group, and includes at least one first cam follower; a second movable lens frame which supports a second lens group, and includes at least one second cam follower; a linear guide ring which is coaxially provided about an optical axis, and includes at least one linear guide slot extending parallel to the optical axis; and a cam ring which is coaxially provided around the linear guide ring, the cam ring including at least one first cam groove and at least one second cam groove. The first cam follower and the second cam follower pass through a common the linear guide slot and engage in the first cam groove and the second cam groove, respectively, so that a rotation of one of the cam ring and the linear guide ring relative to the other causes the first movable lens frame and the second movable lens frame to move along the optical axis via engagement of the first cam follower with the linear guide slot and the first cam groove and via engagement of the second cam follower with the linear guide slot and second cam groove, respectively. The cam ring is provided with a large ring portion, a middle ring portion having a smaller diameter than the large ring portion, and a small ring portion having a smaller diameter than the middle ring portion, a first radial flange portion which is positioned between the large ring portion and the middle ring portion to connect the large ring portion with the middle ring portion, and a second radial flange portion which is positioned between the middle ring portion and the small ring portion to connect the middle ring portion with the small ring portion. The first cam groove is formed on both the middle ring portion and the first radial flange portion so that one end of the first cam groove constitutes a first open end at the first radial flange portion, whereby the first cam follower can be inserted into the first cam groove through the first open end. The second cam groove is formed on both the small ring portion and the second radial flange portion so that one end of the second cam groove constitutes a second open end at the second radial flange portion, whereby the second cam follower can be inserted into the second cam groove through the second open end.

It is desirable for the diameter of the cam ring to decrease in a rearward direction of the cam ring so that the large ring portion is positioned in front of the middle ring portion and the middle ring portion is positioned in front of the small ring portion, with the first radial flange portion being positioned between the large ring portion and the middle ring portion and with the second radial flange portion being positioned between the middle ring portion and the small ring portion. A front end of the first cam groove extends to a front surface of the first radial flange portion to be formed as the first open end on the front surface of the first radial flange portion, so that the first cam follower can be inserted into the first cam groove through the first open end from front of the cam ring. A front end of the second cam groove extends to a front surface of the second radial flange portion to be formed as the second open end on the front surface of the second radial flange portion, so that the second cam follower can be inserted into the second cam groove through the second open end from front of the cam ring.

According to another embodiment, a cam ring is provided, including at least one cam groove in which at least one cam follower formed on a linearly-guided movable member is engaged, a rotation of the cam ring causing the linearly-guided movable member to move along an axis of the cam ring by engagement of the cam follower with the cam groove. The cam ring is provided with a large ring portion, a small ring portion having a smaller diameter than the large ring portion, and a radial flange portion which is positioned between the large ring portion and the small ring portion to connect the large ring portion with the small ring portion. The cam groove is formed on both the small ring portion and the radial flange portion so that one end of the cam groove constitutes an open end at the radial flange portion, whereby the cam follower can be inserted into the cam groove through the open end.

The cam ring can include coaxial first, second and third ring portions having different diameters decreasing in the optical axis direction of the zoom lens barrel, a first radial flange portion which connects the first ring portion with the second ring portion and a second radial flange portion which connects the second ring portion with the third ring portion. One of the cam grooves is formed on both the second ring portion and the first radial portion, and the other of the cam grooves is formed on both the third ring portion and the second radial portion for inserting and guiding the cam followers provided on each of the two movable lens frames, respectively.

The present disclosure relates to subject matter contained in Japanese Patent Application No. 2002-131420 (filed on May 7, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
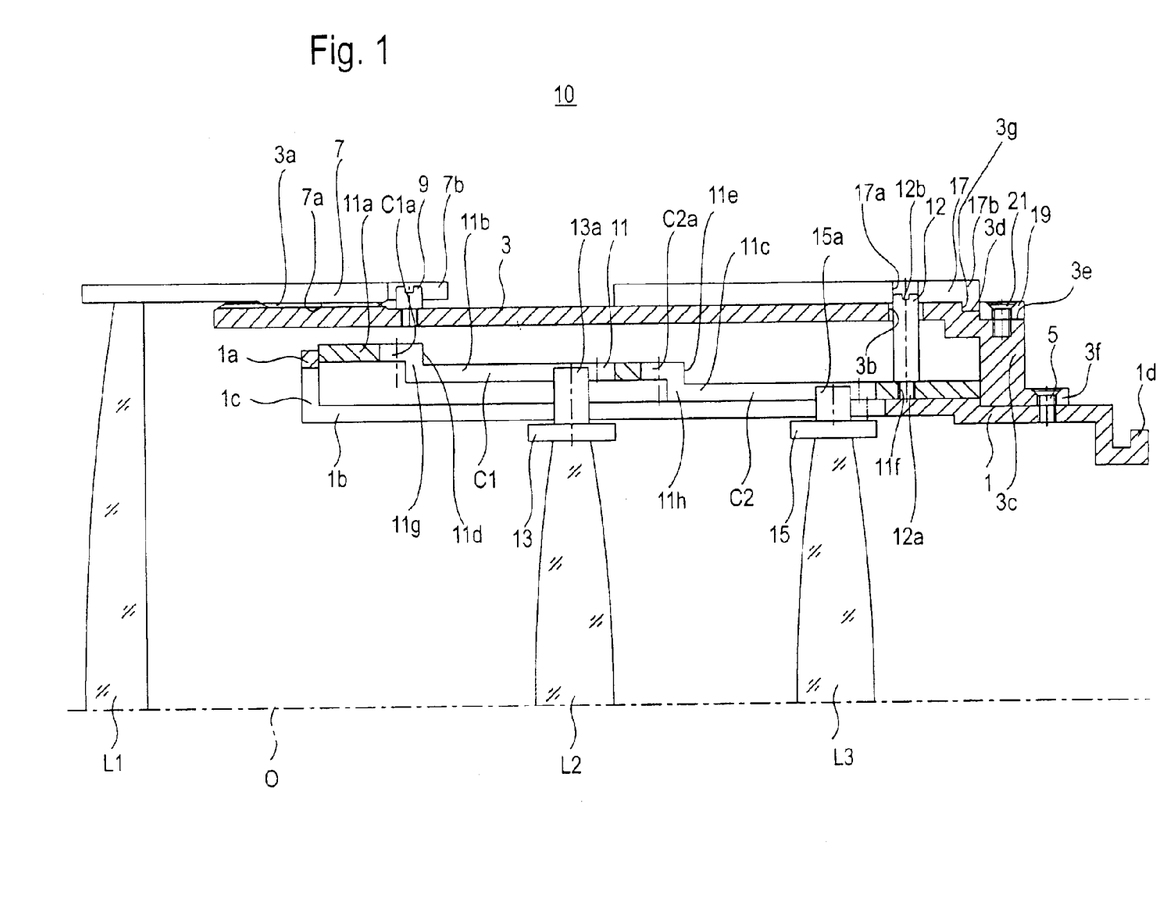
FIG. 1 is an axial cross sectional view of an embodiment of a zoom lens barrel according to the present invention, showing an upper half of the zoom lens barrel from an optical axis.

FIG. 1 shows an embodiment of a zoom lens barrel 10 according to the present invention. The zoom lens barrel 10 is used as an interchangable lens for camera, and is provided with a photographing optical system having a first lens group L1, a second lens group L2 and a third lens group L3, in that order from the object side (i.e., the left side as viewed in FIG. 1). The zoom lens barrel 10 is provided with a linear guide ring 1, a cam ring 11, a stationary barrel 3, in that order in a direction radially outwards from an optical axis O of the photographing optical system. The zoom lens barrel 10 is provided on a front portion of the stationary barrel 3 with a focus ring 7 which is manually rotated to carry out a focusing operation, and is further provided on a rear part of the stationary barrel 3 with a zoom ring 17 which is manually rotated to perform a zooming operation. A rotation of the zoom ring 17 causes the second and third lens groups L2 and L3 to move along the optical axis O while changing the space therebetween in a predetermined moving manner to perform the zooming operation, while a rotation of the focus ring 7 causes the first lens group L1 to move along the optical axis O relative to the second and third lens groups L2 and L3 to perform the focusing operation.

The linear guide ring 1, which is formed as a substantially cylindrical member, the front and rear ends of which being formed as open ends, is prevented from either moving along the optical axis or rotating about the optical axis O. Namely, the linear guide ring 1 is a stationary ring. The linear guide ring 1 is provided at the front end thereof with an outer flange 1a which extends radially outwards. The linear guide ring 1 is provided, at equi-angular intervals in a circumferential direction of the linear guide ring 1, with a set of three linear guide slots 1b which extend parallel to the optical axis O. The outer flange 1a of the linear guide ring 1 is provided with a set of three radial slots 1c which are communicatively connected to the front ends of the set three linear guide slots 1b, respectively. The linear guide ring 1 is provided at the rear end thereof with a mount ring portion 1d which is detachably attached to a camera body (not shown).

The stationary ring 3, which is formed as a substantially cylindrical member having a diameter greater than the diameter of the linear guide ring 1, is coaxially positioned around the linear guide ring 1. The front end of the stationary barrel 3 is open. The stationary barrel 3 is provided at the rear end thereof with an inner flange 3c which extends radially inwards. The inner flange 3c is provided with a fixing ring portion 3f which extends rearwards from the inner edge of the inner flange 3c to be fixed to an outer peripheral surface of the stationary ring 1 by set screws 5 (only one of which appears in FIG. 1). Accordingly, the stationary barrel 3 is prevented from either moving along the optical axis or rotating about the optical axis O.

The stationary barrel 3 is provided, on an outer peripheral surface thereof in the vicinity of the front end of the stationary barrel 3, with a male lead screw portion 3a. The focus ring 7, which is formed as a substantially cylindrical member, is provided on an inner peripheral surface thereof with a female lead screw portion 7a which is engaged with the male lead screw portion 3a of the stationary barrel 3. If manually rotated about the optical axis O, the focus ring 7 rotates about the optical axis O while moving along the optical axis O due to engagement of the male lead screw portion 3a with the female lead screw portion 7a. The focus ring 7 is provided at the rear end thereof with a circumferential cutout portion 7b which is elongated in a circumferential direction of the focus ring 7, while a pin 9 which is fixed to an outer peripheral surface of the stationary barrel 3 in the vicinity of the front end thereof is engaged in the circumferential cutout portion 7b. A range of rotation of the focus ring 7 about the optical axis O with respect to the stationary barrel 3 is defined by engagement of the pin 9 with the circumferential cutout portion 7b. The first lens group L1 is fitted in the focus ring 7 to be held thereby in the vicinity of the front end thereof.

Figure 5:
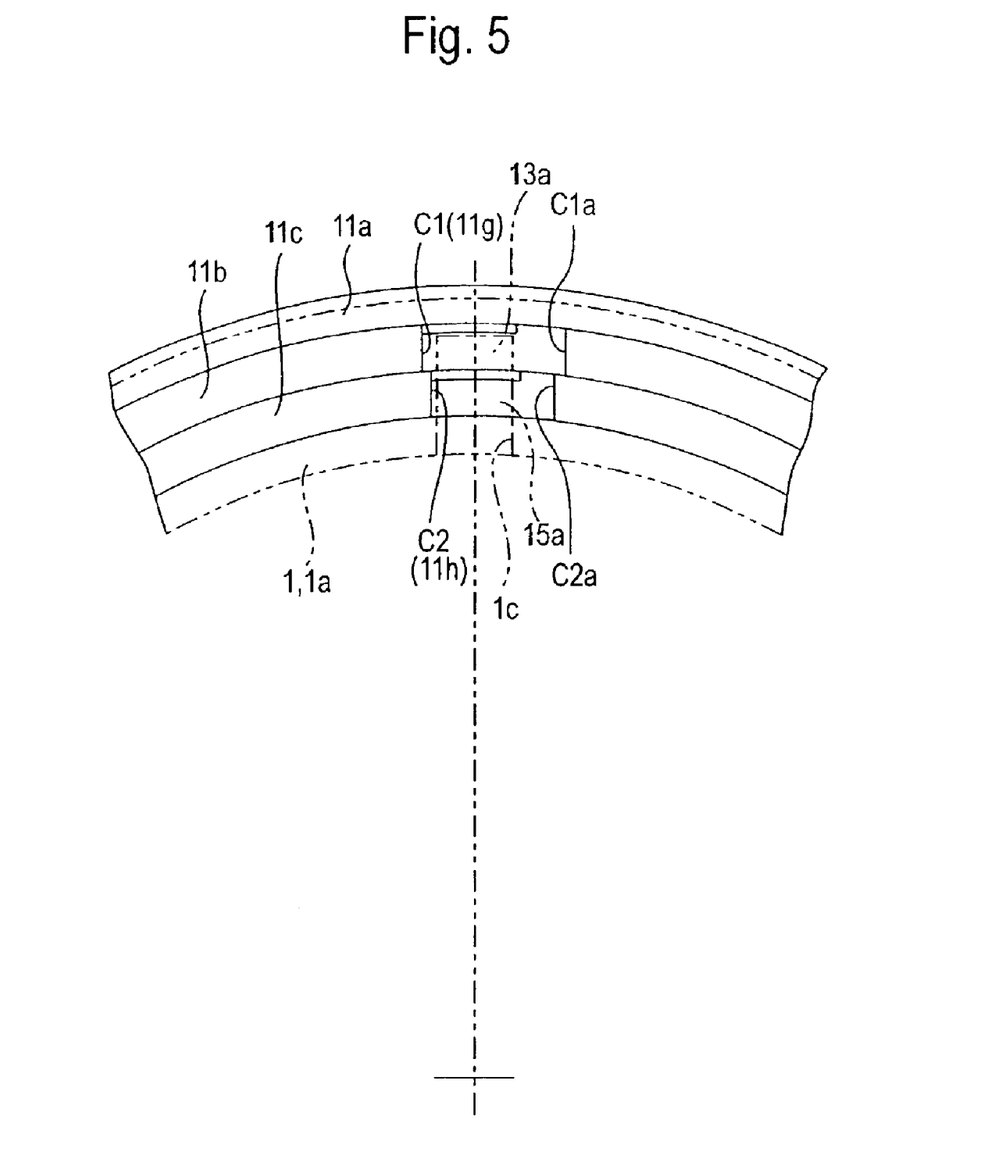
FIG. 5 is a fragmentary front view of the cam ring when the zoom lens barrel is assembled as shown FIG. 4.

The cam ring 11 is positioned between the linear guide ring 1 and the stationary barrel 3. Front and rear ends of the cam ring 11 are formed as open ends. The diameter of the cam ring 11 decreases stepwise in a rearward direction. Namely, as shown in FIG. 5, the cam ring 11 is provided with a front ring portion (large ring portion/first ring portion) 11a, a middle ring portion (middle diameter portion/second ring portion) 11b and a rear ring portion (small ring portion/third ring portion) 11c, in this order from the front to the rear of the cam ring 11. The cam ring 11 is provided with a front flange portion (radial flange portion) 11d which is positioned between the front ring portion 11a and the middle ring portion 11b to connect the front ring portion 11a with the middle ring portion 11b, and a rear flange portion (radial flange portion) 11e which is positioned between the middle ring portion 11b and the rear ring portion 11c to connect the middle ring portion 11b with the rear ring portion 11c.

The rear ring portion 11c of the cam ring 11 is provided in the vicinity of the rear end thereof with a female screw hole 11f in which a male screw portion 12a of a rotation restriction pin 12 is screwed so that the rotation restriction pin 12 projects radially outwards from the rear ring portion 11c. The rotation restriction pin 12 penetrates through the stationary barrel 3 to project radially outwards therefrom through a circumferential groove 3b which is formed on the stationary barrel 3 in the vicinity of the rear end thereof to extend in a circumferential direction of the stationary barrel 3. A range of rotation of the cam ring 11 about the optical axis O with respect to the stationary barrel 3 is defined by engagement of the rotation restriction pin 12 with the circumferential groove 3b of the stationary barrel 3. Note that in FIGS. 2, 3 and 4, the circumferential groove 3b is shown on the cam ring 11 only to show the positional relationship therebetween, and is not actually formed thereon.

In addition, the cam ring 11 cannot move along the optical axis O with respect to the stationary barrel 3 since the front and rear ends of the cam ring 11 are in contact with a rear surface of the outer flange 1a of the linear guide ring 1 and a front surface of the inner flange 3c of the stationary barrel 3, respectively.

The middle ring portion 11b of the cam ring 11 is provided, at equi-angular intervals in a circumferential direction of the middle ring portion 11b, with a set of three first cam grooves C1 having the same shape and size. As shown in FIGS. 1 through 4, the rear end of each first cam groove C1 extends to a point in front of the rear end of the middle ring portion 11b, and the front end of each first cam groove C1 extends to a front surface of the front flange portion 11d to be formed as an open end on the front surface of the front flange portion 11d. Namely, three front insertion holes 11g, which communicatively connect to the first cam grooves C1 respectively, are formed at the front flange portion 11d.

The cam ring 11 is provided between the front ring portion 11a and the front flange portion 11d with a set of three front end slots C1a which are joined to the front ends of the set of three first cam grooves C1 (i.e., the front insertion holes 11g), respectively. The set of three front end slots C1a are inevitably formed on the cam ring 11 when the set of three first cam grooves C1 are drilled on the cam ring 11 from the outside of the cam ring 11. Each front end slot C1a does not serve as part of the associated first cam groove C1.

The rear ring portion 11c of the cam ring 11 is provided, at equi-angular intervals in a circumferential direction of the rear ring portion 11c, with a set of three second cam grooves C2 having the same shape and size. As shown in FIGS. 1 through 4, the rear end of each second cam groove C2 extends to a point in front of the rear end of the rear ring portion 11c, and the front end of each second cam groove C2 extends to a front surface of the rear flange portion 11e to be formed as an open end on the front surface of the rear flange portion 11e. Namely, three rear insertion holes 11h, which communicatively connect with the second cam grooves C2 respectively, are formed at the rear flange portion 11e.

The cam ring 11 is provided between the middle ring portion 11b and the rear flange portion 11e with a set of three front end slots C2a which are joined to the front ends of the set of three second cam grooves C2 (i.e., the rear insertion holes 11h), respectively. Similar to the set of three front end slots C1a, the set of three front end slots C2a are inevitably formed on the cam ring 11 when the set of three second cam grooves C2 are drilled on the cam ring 11 from the outside of the cam ring 11. Each front end slot C2a does not serve as part of the associated second cam groove C2.

Note that in FIG. 1, in order to clearly illustrate the area formed by the cam grooves in the optical axis direction, the first cam groove(s) C1 and the second cam groove(s) C2 are shown as linear grooves, however, an actual representation of cam grooves in section would reveal only a portion of each cam groove.

The zoom lens barrel 10 is provided inside the linear guide ring 1 with a front movable lens frame (linearly-guided movable member) 13 which supports the second lens group L2 that serves as a movable lens group to carry out a zooming operation. The front movable lens frame 13 is provided, on an outer peripheral surface thereof at equi-angular intervals in a circumferential direction of the front movable lens frame 13, with a set of three follower pins (cam followers) 13a which are formed integrally with the front movable lens frame 13 to extend radially outwards. The set of three follower pins 13a pass through the set of three linear guide slots 1b to be engaged in the set of three first cam grooves C1, respectively.

The zoom lens barrel 10 is provided inside the linear guide ring 1 with a rear movable lens frame (linearly-guided movable member) 15 which supports the third lens group L3 that serves as a movable lens group to carry out a zooming operation. The rear movable lens frame 15 is provided, on an outer peripheral surface thereof at equi-angular intervals in a circumferential direction of the rear movable lens frame 15, with a set of three follower pins (cam followers) 15a which are formed integral with the rear movable lens frame 15 to extend radially outwards. The set of three follower pins 15a pass through the set of three linear guide slots 1b to be engaged in the set of three second cam grooves C2, respectively.

The zoom ring 17, which is concentric to the stationary barrel 3, is fitted on the rear of the stationary barrel 3 to be freely rotatable about the optical axis O. The zoom ring 17 is provided in the vicinity of the rear end thereof with a cylindrical hole 17a having a diameter substantially identical to the diameter of the rotation restriction pin 12. The tip (radially outer end) of the rotation restriction pin 12 is fitted into the cylindrical hole 17a to be fixed thereto. Rotating the zoom ring 17 between a wide-angle-extremity rotational position and a telephoto-extremity rotational position causes the zoom ring 17 and the cam ring 11 to rotate together about the optical axis O.

The zoom ring 17 is provided at the rear end thereof with an inner flange 17b which extends radially inwards. The stationary barrel 3 is provided on an outer peripheral surface thereof in the vicinity of the rear end of the stationary barrel 3 with a front stepped portion 3d, the diameter of which is smaller than that of a portion of the stationary barrel 3 in front of the front stepped portion 3d, so that the inner flange 17b is fitted on the front stepped portion 3d. The stationary barrel 3 is provided on an outer peripheral surface thereof between the rear end of the stationary barrel 3 and the front stepped portion 3d with a rearmost stepped portion 3e, the diameter of which is smaller than that of the front stepped portion 3d. The rear stepped portion 3e is formed around the inner flange 3c. A stop ring 19 is fitted on the rear stepped portion 3e, and is fixed to the rear stepped portion 3e by set screws 21 (only one of which is shown in FIG. 1). The stop ring 19 is positioned immediately behind the front stepped portion 3d to support the inner flange 17b between the stop ring 19 and a front annular surface 3g of the front stepped portion 3d to thereby prevent the zoom ring 17 to move along the optical axis O with respect to the stationary barrel 3.

Figure 2:
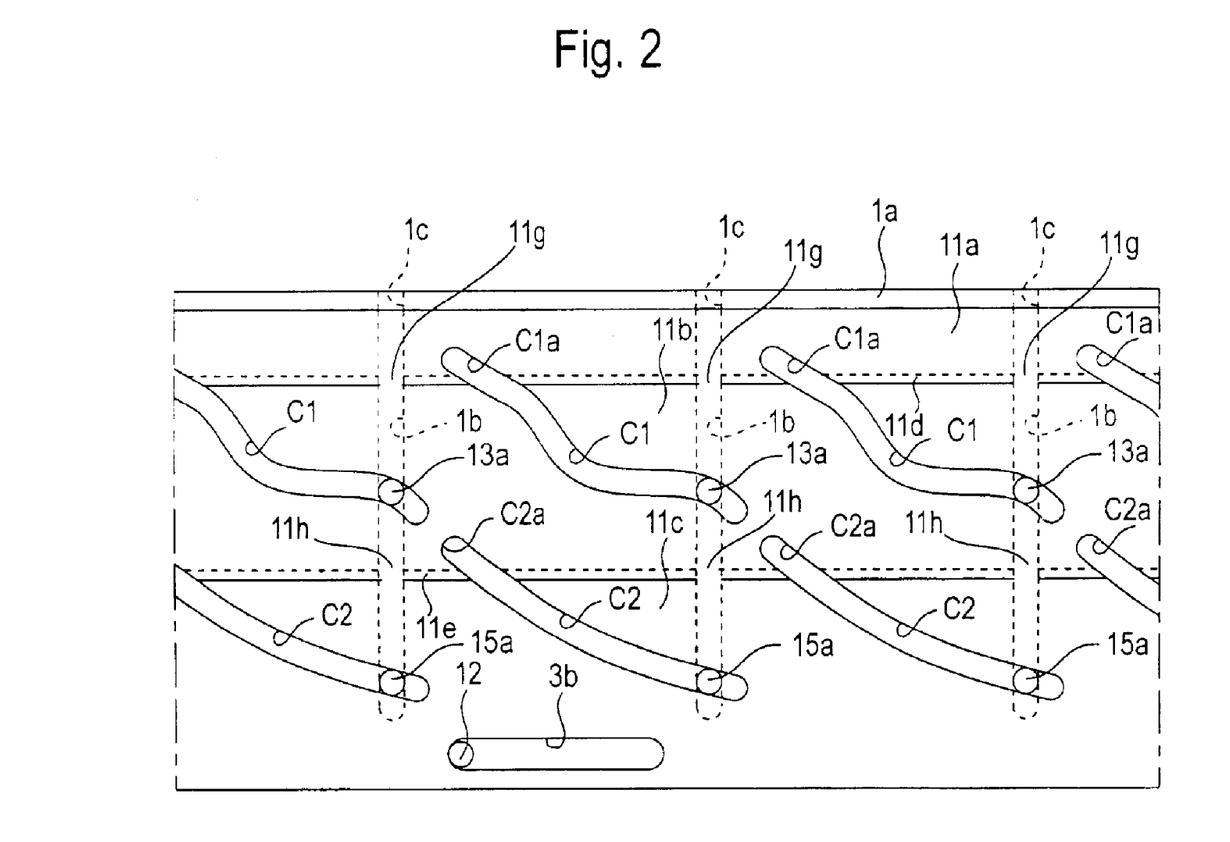
FIG. 2 is a developed view of a cam ring having cam grooves, a linear guide ring having linear guide slots, and follower pins extending from each of two lens support frames, showing a positional relationship among the cam grooves, the linear guide slots and the follower pins when the cam ring is in the wide-angle-extremity rotational position.

A rotation of the zoom ring 17 about the optical axis O causes the cam ring 11 to rotate about the optical axis O. This rotation of the cam ring 11 causes the second lens group L2 to linearly move along the optical axis O between a wide-angle extremity and a telephoto extremity in the range of movement of the second lens group L2 within the length of the middle ring portion 11b in the optical axis direction, due to engagement of the set of three first cam grooves C1 with the set of three linear guide slots 1b. At the same time, the rotation of the cam ring 11 causes the third lens group L3 to linearly move along the optical axis O between a wide-angle extremity and a telephoto extremity in the range of movement of the third lens group L3 within the length of the rear ring portion 11c in the optical axis direction, due to engagement of the set of three second cam grooves C2 with the set of three linear guide slots 1b. If the zoom ring 17 is rotated to the wide-angle-extremity rotational position thereof, each follower pin 13a (the second lens group L2) and each follower pin 15a (the third lens group L3) move to their respective wide-angle-extremity positions as shown in FIG. 2. Conversely, if the zoom ring 17 is rotated to the telephoto-extremity rotational position thereof, each follower pin 13a (the second lens group L2) and each follower pin 15a (the third lens group L3) move to their respective telephoto-extremity positions as shown in FIG. 3.

The procedure for installation of the front and rear lens support frames 13 and 15 in the zoom lens barrel 10 will be hereinafter discussed. The installation procedure is carried out before the focus ring 7 is mounted on the stationary barrel 3 and before the rotation restriction pin 12 is fixed to the cam ring 11.

Figure 4:
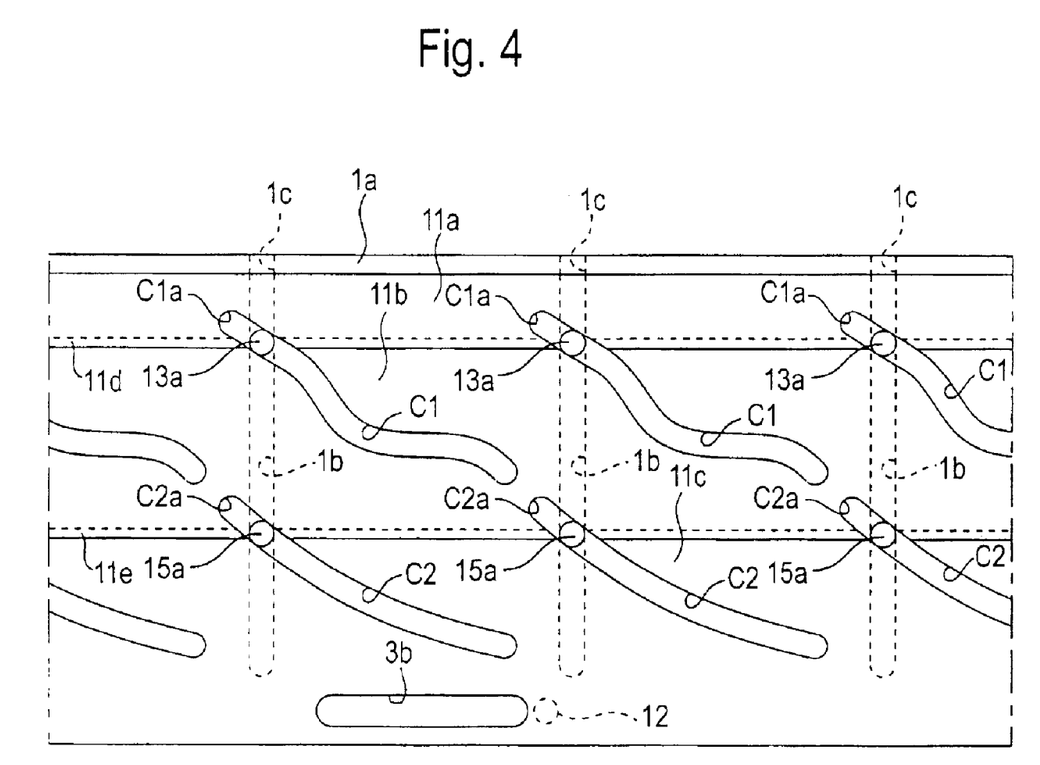
FIG. 4 is a view similar to that of FIG. 2, showing a positional relationship among the cam grooves, the linear guide slots and the follower pins when the cam ring is rotated to a rotational position thereof beyond the telephoto-extremity rotational position.

As shown in FIG. 4, firstly, the cam ring 11 is rotated to a rotational position thereof beyond the telephoto-extremity rotational position so that the three linear guide slots 1b radially overlap the three front insertion holes 11g (three boundary portions between the front ends of the three first cam grooves C1 and the rear ends of three front end slots C1a) formed on the front flange portion 11d, respectively, and so that the three linear guide slots 1b radially overlap the three rear insertion holes 11h (three boundary portions between the front ends of the three second cam grooves C2 and the rear ends of three front end slots C2a) formed on the rear flange portion 11e, respectively. In this state shown in FIG. 4, firstly the set of three follower pins 15a of the rear movable lens frame 15 are inserted into the set of three linear guide slots 1b via the set of three radial slots 1c of the linear guide ring 1 from the front of the zoom lens barrel 10, respectively. Subsequently, the set of three follower pins 15a are moved rearwards in the set of three linear guide slots 1b to be engaged in the three rear insertion holes 11h of the rear flange portion 11e, respectively. Subsequently, the set of three follower pins 13a of the front movable lens frame 13 are inserted into the set of three linear guide slots 1b via the set of three radial slots 1c of the linear guide ring 1 from the front of the zoom lens barrel 10, respectively. Subsequently, the set of three follower pins 13a are moved rearwards in the set of three linear guide slots 1b to be engaged in the three front insertion holes 11g of the front flange portion 11d, respectively.

Figure 3:
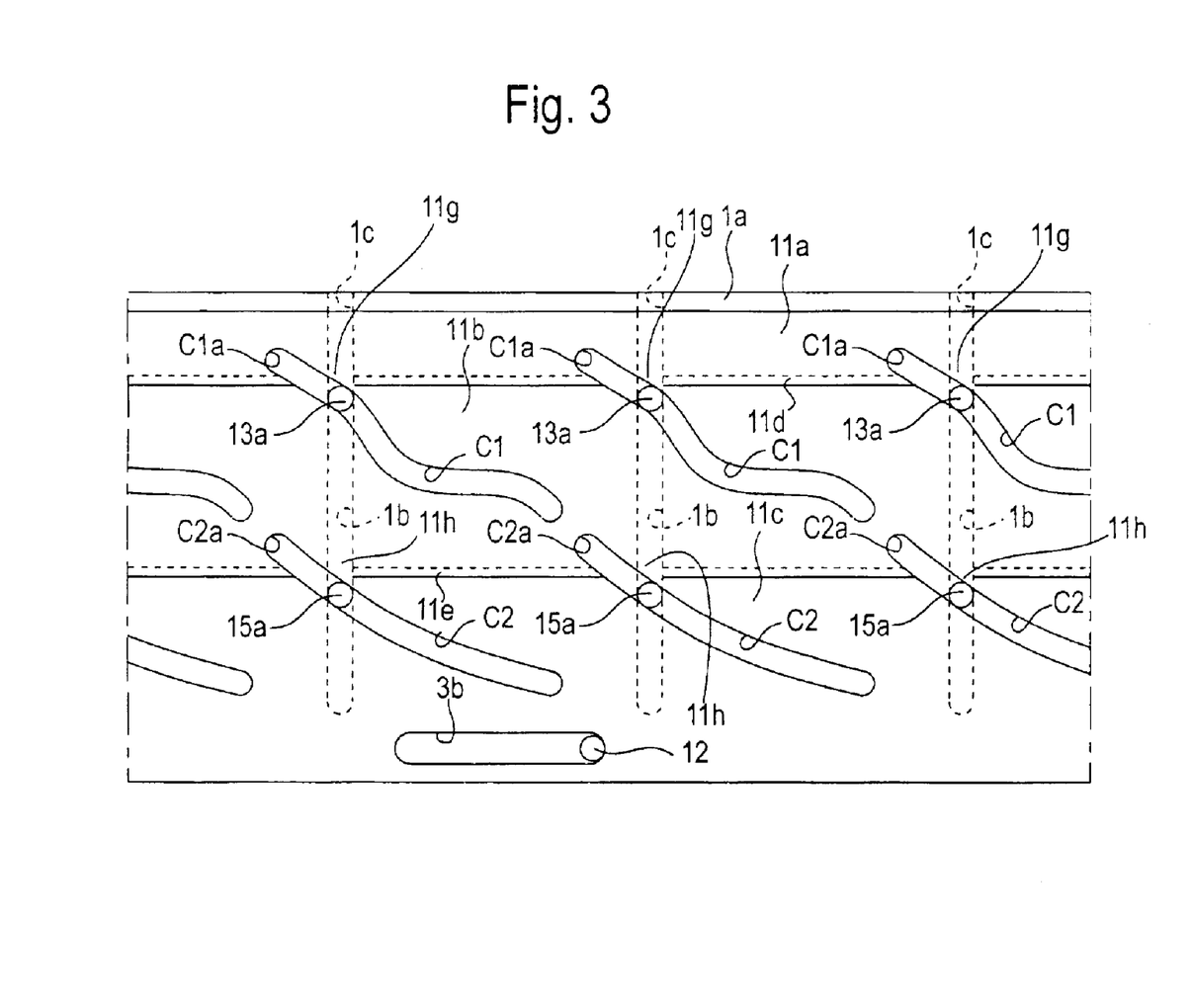
FIG. 3 is a view similar to that of FIG. 2, showing a positional relationship among the cam grooves, the linear guide slots and the follower pins when the cam ring is in the telephoto-extremity rotational position.

Thereafter, rotating the cam ring 11 to the telephoto-extremity rotational position thereof causes the set of three follower pins 13a and the set of three follower pins 15a to move rearwards to their respective positions shown in FIG. 3. In this state shown in FIG. 3, each follower pin 13a and each follower pin 15a cannot come out of the associated first cam groove C1 and the associated second cam groove C2, respectively. This completes the operation for installation of the front and rear movable lens frames 13 and 15.

Thereafter, the focus ring 7 is mounted on the stationary barrel 3 while the rotation restriction pin 12 is fixed to the cam ring 11. This completes the assembly work for the zoom lens barrel 10.

The procedure for removal of the front and rear lens support frames 13 and 15 from the zoom lens barrel 10 will be hereinafter discussed.

Firstly, the focus ring 7 is removed from the stationary barrel 3. Subsequently, a flatblade screw driver (not shown) is inserted into the cylindrical hole 17a so that the blade of the screw driver is engaged in a groove 12b formed on the head of the rotation restriction pin 12. The screw driver is rotated so that the rotation restriction pin 12 is screwed off the cam ring 11.

Subsequently, the cam ring 11 is rotated to a rotational position thereof beyond the telephoto-extremity rotational position so that the three linear guide slots 1b radially overlap the three front insertion holes 11g on the front flange portion 11d to move the three follower pins 13a to the three front insertion holes 11g, respectively, and so that the three linear guide slots 1b radially overlap the three rear insertion holes 11h on the rear flange portion 11e to move the three follower pins 15a to the three rear insertion holes 11h, respectively, as shown in FIG. 4.

In this state shown in FIG. 4, firstly the set of three follower pins 13a of the front movable lens frame 13 are moved forwards in the set of three linear guide slots 1b to be disengaged therefrom through the set of three radial slots 1c, respectively, to thereby remove the front movable lens frame 13 from the cam ring 11 and the linear guide ring 1. Subsequently, the set of three follower pins 15a of the rear movable lens frame 15 are moved forwards in the set of three linear guide slots 1b to be disengaged therefrom through the set of three radial slots 1c, respectively, to thereby remove the rear movable lens frame 15 from the cam ring 11 and the linear guide ring 1.

As can be understood from the above description, according to the present embodiment of the zoom lens barrel to which the present invention is applied, the set of follower pins 13a and the set of follower pins 15a can easily be engaged in and disengaged from the set of first cam grooves C1 and the set of second cam grooves C2, respectively, because each follower pin 13a and each follower pin 15a do not have to be respectively removed from the front movable lens frame 13 and the rear movable lens frame 15 in the engaging or disengaging operation.

In addition, the set of follower pins 13a and the set of follower pins 15a can be engaged in and disengaged from the set of first cam grooves C1 and the set of second cam grooves C2 through the insertion holes 11g and 11h, respectively, even if each follower pin 13a and each follower pin 15a are respectively formed integral with the front movable lens frame 13 and the rear movable lens frame 15 since each follower pin 13a and each follower pin 15a do not have to be respectively removed from the front movable lens frame 13 and the rear movable lens frame 15 in the engaging or disengaging operation.

Moreover, the set of follower pins 13a and the set of follower pins 15a can be engaged in and disengaged from the set of first cam grooves C1 and the set of second cam grooves C2, respectively, even in a state where the stationary barrel 3, which is provided as a cylindrical member independent of the cam ring 11, is positioned around the cam ring 11.

Furthermore, a reduction in strength of the cam ring 11 due to the formation of the first and second cam grooves C1 and C2 on the cam ring 11 can be minimized because the front and rear ends of each first cam groove C1 do not reach the front and rear ends of the cam ring 11, respectively, and because the front and rear ends of each second cam groove C2 do not reach the front and rear ends of the cam ring 11, respectively, either.

Furthermore, since each of the first and second cam grooves C1 and C2 is formed as a through slot, the wall thickness of the cam ring can be reduced as compared with the case where each cam groove is formed as a bottomed cam groove. This makes it possible to achieve the cam ring 11 having a small diameter, which in turn makes it possible to achieve the zoom lens barrel 10 having a small diameter.

However, all the cam grooves C1 and C2 formed on the cam ring 11 can be replaced by bottomed cam grooves formed on an inner peripheral surface of the cam ring 11.

The front movable lens frame 13 and the rear movable lens frame 15 can be inserted into and removed from the zoom lens barrel 10 from the rear of the zoom lens barrel 10 if the cam ring 11 is modified so that the diameter thereof increases stepwise in a direction from front to rear and so that the outer flange 1a and the set of three radial slots 1c are formed at the rear end of the cam ring As can be understood from the foregoing, according to the present invention, each cam follower on a movable lens frame can easily be engaged in and disengaged from an associated cam groove. Moreover, each cam follower on a movable lens frame can be engaged in and disengaged from an associated cam groove even if each follower pin is formed integral with the movable lens frame. Furthermore, each cam follower on a movable lens frame can be engaged in and disengaged from an associated cam groove even in a state where a cylindrical member is positioned around the cam ring. Furthermore, the cam ring does not have to be enlarged in diameter, and a reduction in strength of the cam ring due to the formation of cam grooves on the cam ring can be minimized.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A zoom lens barrel comprising:

a linear guide ring which is positioned about an optical axis, said linear guide ring including at least one linear guide slot extending parallel to said optical axis;

a cam ring which is coaxially positioned around said linear guide ring, said cam ring including at least one cam groove; and a movable lens frame which supports a lens group and includes at least one cam follower, said cam follower passes through said linear guide slot to be engaged in said cam groove so that a rotation of one of said cam ring and said linear guide ring relative to the other causes said movable lens frame to move along said optical axis via engagement of said cam follower with said linear guide slot and said cam groove;

wherein said cam ring is provided with a large ring portion, a small ring portion having a smaller diameter than said large ring portion, and a radial flange portion which is positioned between said large ring portion and said small ring portion to connect said large ring portion with said small ring portion; and wherein said cam groove is formed on both said small ring portion and said radial flange portion so that one end of the cam groove constitutes an open end at said radial flange portion, whereby said cam follower can be inserted into said cam groove through said open end.

2. The zoom lens barrel according to claim 1, said zoom lens barrel having at least two said movable lens frames, each having said cam follower which is engaged with a corresponding said cam groove, wherein said cam ring comprises coaxial first, second and third ring portions having different diameters decreasing in the optical axis direction of the zoom lens barrel, a first radial flange portion which connects said first ring portion with said second ring portion and a second radial flange portion which connects said second ring portion with said third ring portion; and wherein one of said cam grooves is formed on both said second ring portion and the first radial portion, and the other of said cam grooves is formed on both said third ring portion and said second radial portion for inserting and guiding said cam followers provided on each of said two movable lens frames, respectively.

3. The zoom lens barrel according to claim 1, wherein said cam groove is formed on said cam ring as a through slot radially penetrating through said cam ring.

4. The zoom lens barrel according to claim 1, wherein said diameter of said cam ring decreases in a rearward direction of said cam ring so that said large ring portion is positioned in front of said small ring portion with said radial flange portion being provided therebetween; and wherein a front end of said cam groove extends to a front surface of said radial flange portion to be formed as an open end on said front surface of said radial flange portion so that said cam follower can be inserted into said cam groove through said open end from the front of said cam ring.

5. The zoom lens barrel according to claim 1, wherein said cam follower is formed integral with said movable lens frame.

6. The zoom lens barrel according to claim 1, wherein said linear guide ring is a stationary member.

7. The zoom lens barrel according to claim 6, further comprising a mount ring formed at a rear end of said zoom lens barrel, said linear guide ring being formed integral with said mount ring.

8. The zoom lens barrel according to claim 1, further comprising a zoom ring which is coaxially provided around said cam ring, said cam ring being rotated about said optical axis via rotation of said zoom ring.

9. The zoom lens barrel according to claim 8, further comprising a stationary barrel which is coaxially provided between said cam ring and said zoom ring in the radial direction, said zoom ring being rotatably supported on said stationary barrel.

10. A zoom lens barrel comprising:

a first movable lens frame which supports a first lens group, and includes at least one first cam follower;

a second movable lens frame which supports a second lens group, and includes at least one second cam follower;

a linear guide ring which is coaxially provided about an optical axis, and includes at least one linear guide slot extending parallel to said optical axis; and a cam ring which is coaxially provided around said linear guide ring, said cam ring including at least one first cam groove and at least one second cam groove;

wherein said first cam follower and said second cam follower pass through a common said linear guide slot and engage in said first cam groove and said second cam groove, respectively, so that a rotation of one of said cam ring and said linear guide ring relative to the other causes said first movable lens frame and said second movable lens frame to move along said optical axis via engagement of said first cam follower with said linear guide slot and said first cam groove and via engagement of said second cam follower with said linear guide slot and said second cam groove, respectively;

wherein said cam ring is provided with a large ring portion, a middle ring portion having a smaller diameter than said large ring portion, a small ring portion having a smaller diameter than said middle ring portion, a first radial flange portion which is positioned between said large ring portion and said middle ring portion to connect said large ring portion with said middle ring portion, and a second radial flange portion which is positioned between said middle ring portion and said small ring portion to connect said middle ring portion with said small ring portion;

wherein said first cam groove is formed on both said middle ring portion and said first radial flange portion so that one end of said first cam groove constitutes a first open end at said first radial flange portion, whereby said first cam follower can be inserted into said first cam groove through said first open end; and wherein said second cam groove is formed on both said small ring portion and said second radial flange portion so that one end of said second cam groove constitutes a second open end at said second radial flange portion, whereby said second cam follower can be inserted into said second cam groove through said second open end.

11. The zoom lens barrel according to claim 10, wherein said diameter of said cam ring decreases in a rearward direction of said cam ring so that said large ring portion is positioned in front of said middle ring portion and said middle ring portion is positioned in front of said small ring portion, with said first radial flange portion being positioned between said large ring portion and said middle ring portion and with said second radial flange portion being positioned between said middle ring portion and said small ring portion;

wherein a front end of said first cam groove extends to a front surface of said first radial flange portion to be formed as said first open end on said front surface of said first radial flange portion, so that said first cam follower can be inserted into said first cam groove through said first open end from front of said cam ring; and wherein a front end of said second cam groove extends to a front surface of said second radial flange portion to be formed as said second open end on said front surface of said second radial flange portion, so that said second cam follower can be inserted into said second cam groove through said second open end from front of said cam ring.

12. A cam ring including at least one cam groove in which at least one cam follower formed on a linearly-guided movable member is engaged, a rotation of said cam ring causing said linearly-guided movable member to move along an axis of said cam ring by engagement of said cam follower with said cam groove;

wherein said cam ring is provided with a large ring portion, a small ring portion having a smaller diameter than said large ring portion, and a radial flange portion which is positioned between said large ring portion and said small ring portion to connect said large ring portion with said small ring portion;

wherein said cam groove is formed on both said small ring portion and said radial flange portion so that one end of said cam groove constitutes an open end at said radial flange portion, whereby said cam follower can be inserted into said cam groove through said open end.

13. The cam ring according to claim 12, comprising:

coaxial first, second and third ring portions having different diameters decreasing in the optical axis direction of the zoom lens barrel, a first radial flange portion which connects said first ring portion with said second ring portion and a second radial flange portion which connects said second ring portion with said third ring portion; and wherein one of said cam grooves is formed on both said second ring portion and the first radial portion, and the other of said cam grooves is formed on both said third ring portion and said second radial portion for inserting and guiding said cam followers provided on each of said two movable lens frames, respectively.

* * * * *